UNITED STATES PATENT OFFICE.

MORDECAI T. FUSSELL, OF NEW YORK, N. Y.

METHOD OF PACKING AND PRESERVING ICE-CREAM.

SPECIFICATION forming part of Letters Patent No. 310,266, dated January 6, 1885.

Application filed July 3, 1884. (No specimens.)

*To all whom it may concern:*

Be it known that I, MORDECAI T. FUSSELL, a citizen of the United States, residing in the city of New York, in the county and State of New York, have invented certain new and useful Improvements in the Method of Packing and Preserving Ice-Cream, of which the following is a specification.

In packing ice-cream, water-ices, or similar substances for market in small quantities, it has been customary to place the cream or other like substance in a box of card-board or similar material, and then to inclose the box in a wrapper (generally of paper) for convenience of transportation and to prevent the cream from melting. In practice, however, the temperature of the box and cream contained in it soon becomes equalized with that of the inclosing-wrapper, and the cream melts.

Heretofore, in the specification of Letters Patent granted to me February 6, 1883, No. 271,698, I have described a wrapper for inclosing the box containing the cream, and while such wrappers are very efficient in protecting the cream from the softening effect of the air, I find that their effectiveness is greatly increased by subjecting them for a short time to a temperature considerably lower than that of the atmosphere. Indeed, if newspaper of several thicknesses is placed for some hours in a temperature of 18° Fahrenheit, or less, its power of preserving the cream is made equal to that of a felt wrapper half an inch thick, and if a wrapper of felt is similarly treated its preserving power is increased in the same ratio.

My invention, then, consists in combining with a box or package containing ice-cream, water-ice, or similar substance, a wrapper of suitable material which has been reduced to a temperature considerably lower than that of the outside air. The wrappers, which may be of felt or other suitable material—such as porous paper—are placed in a refrigerator until their temperature is reduced to any desired point, and each box or package when ready for transportation is inclosed in one of the wrappers, which may be secured in place by strings or rubber bands, or in any convenient manner. The wrappers may be kept in the refrigerator, ready for use, and only taken out when the box in which the cream is contained is ready to be inclosed. I generally keep the wrappers in the refrigerator until their temperature is reduced to about 18° Fahrenheit, though it may be reduced still lower, and the lower the temperature the greater will be the preservative effect of the wrapper.

What I claim as new, and desire to secure by Letters Patent, is—

1. The combination, with a box or package containing ice-cream, of a refrigerated wrapper of felt or other suitable material, substantially as and for the purposes set forth.

2. The method of preserving ice-cream in a hard condition when packed in boxes for transporation, which consists, first, in placing wrappers of felt or other suitable porous material in a refrigerator until their temperature is reduced to a point lower than that of the external air, and, second, inclosing each box or package of cream in one of such wrappers, substantially as set forth.

MORDECAI T. FUSSELL.

Witnesses:
WM. H. DRAKE,
JULIUS LEVY.